(12) United States Patent
Tyburski et al.

(10) Patent No.: US 10,618,359 B2
(45) Date of Patent: Apr. 14, 2020

(54) PNEUMATIC VEHICLE TIRE

(71) Applicant: CONTINENTAL REIFEN DEUTSCHLAND GMBH, Hannover (DE)

(72) Inventors: Andreas Tyburski, Ilsede (DE); Oliver Schürmann, Langenhagen (DE); Nermeen Nabih, Hannover (DE)

(73) Assignee: Continental Reifen Deutschland GmbH, Hannover (DE)

(*) Notice: Subject to any disclaimer, the term of this patent is extended or adjusted under 35 U.S.C. 154(b) by 370 days.

(21) Appl. No.: 15/528,521

(22) PCT Filed: Nov. 11, 2015

(86) PCT No.: PCT/EP2015/076279
§ 371 (c)(1),
(2) Date: May 22, 2017

(87) PCT Pub. No.: WO2016/113013
PCT Pub. Date: Jul. 21, 2016

(65) Prior Publication Data
US 2018/0079263 A1    Mar. 22, 2018

(30) Foreign Application Priority Data

Jan. 13, 2015 (DE) .................. 10 2015 200 349
Jun. 30, 2015 (DE) .................. 10 2015 212 105

(51) Int. Cl.
*B60C 19/12* (2006.01)
*B60C 19/00* (2006.01)
*B29D 30/06* (2006.01)

(52) U.S. Cl.
CPC ........ *B60C 19/002* (2013.01); *B29D 30/0681* (2013.01); *B29D 30/0685* (2013.01); *B60C 19/122* (2013.01)

(58) Field of Classification Search
CPC ....... B60C 19/00; B60C 19/002; B60C 19/12; B60C 19/122
See application file for complete search history.

(56) References Cited

U.S. PATENT DOCUMENTS 4,239,076 A * 12/1980 Chautard ........... B29D 30/0685
152/505
8,430,143 B2 * 4/2013 Tanno ................... B60C 19/002
152/155
2010/0307655 A1   12/2010 Tanno

FOREIGN PATENT DOCUMENTS

DE      102007028932 A1   12/2008
EP           2006125 A1   12/2008

* cited by examiner

*Primary Examiner* — Justin R Fischer
(74) *Attorney, Agent, or Firm* — Gregory Adams; David Cate

(57) ABSTRACT

The invention relates to a pneumatic vehicle tyre with a sound-absorbing inner absorber (9) adhesively attached in its interior to the inner surface (7) opposite from the tread (1), wherein the inner absorber (9) adheres to an automatically sealing sealant (8), which at least immediately after being applied has the tackiness required for the adhesive attachment. In order not to influence the flow properties of the sealant disadvantageously and in order to ensure a reliable sealing effect of the sealant, a separating layer (10) is arranged between the sealant (8) and the inner absorber (9) and the separating layer (10) is made in such a way as to ensure a sufficient flowability of the sealant (8) for the sealing and a reliable adhesive attachment of the foam ring (9).

20 Claims, 5 Drawing Sheets

PNEUMATIC VEHICLE TIRE

The invention relates to a pneumatic vehicle tire having in its interior a sound-absorbing, annular inner absorber which is adhesively attached to the inner surface opposite from the tread, said inner absorber adhering to a self-sealing sealant, which at least immediately after its application has a tackiness required for the purposes of adhesive attachment. The invention further relates to a method for producing the aforementioned pneumatic vehicle tire.

Such a pneumatic vehicle tire is known from DE 10 2007 028932 A1. The inner absorber is a ring composed of open-cell foam which reduces the vibration of air in the tire and leads to an improvement in the noise conditions in the vehicle. The sealant applied to the inner side of the tire has two functions: It seals an undesired puncture of the tire in the region of the tread, in that in the event of damage to the inner layer the viscous sealant flows into the location of the damage. Moreover, the sealant serves at the same time as a "bonding agent" for securing the sound-absorbing foam ring.

However, the flow characteristics of the sealant may be adversely affected by the inner absorber lying on the sealant, meaning that the desired sealing effect only occurs after a delay or not at all. In cases in which the penetrating foreign body comes out of the tire again and leaves a large air channel, reliable sealing by the sealant adversely affected in terms of its flow characteristics is particularly difficult.

It is an object of the invention to improve the sealing of the tire in the event of punctures. Furthermore, it is an object of the invention to provide a method for producing an aforementioned tire.

According to the invention, the stated object with respect to the pneumatic vehicle tire is achieved by a separating layer being arranged between the sealant and the inner absorber and by the separating layer being made in such a way as to ensure a flowability of the sealant that is sufficient for the purposes of sealing and also a reliable adhesion of the inner absorber.

According to the invention, the flow property of the sealant is positively affected by the separating layer arranged between the sealant and the inner absorber. As a result, the sealant can seal in a reliable manner.

The inner absorber preferably consists of open-cell foam; it alternatively consists of glass wool, of cork or of synthetic fibers (fleece) or of a combination of two or more of the aforementioned materials.

The inner absorber is preferably a roughly annular component which is made as one piece or is composed of two or more individual elements in the shape of circular segments.

The separating layer is made from one piece or from individual segments which overlap or are spaced apart.

In a particular embodiment of the invention, the separating layer is a film provided with a coating. Preferably, the film or its coating is based on silicone or PTFE (fluorinated hydrocarbon compounds, e.g., perfluorooctanoic acid) or consists of oils or various fat types or consists of paper (e.g., parchment paper, baking paper) or fabric (composed of artificial and/or natural fibers).

Silicone is usable at relatively high temperatures; other materials have cost advantages.

The mode of action is the sealing of the surface and reduction of static friction.

It is advantageous when the separating layer have nonstick properties on one side, preferably on the side facing the sealant. Alternatively, the separating layer has nonstick properties on both sides.

In again another embodiment of the invention, the separating layer is a material applied as a liquid, such as, for example, paints and varnishes, spray films, release agents (e.g., mold release agents).

In again another embodiment of the invention, the separating layer is a material applied from the solid phase, such as, for example, a powder.

In again another embodiment of the invention, the separating layer is a material applied from the gaseous phase, such as, for example, condensate, or is bonded to the material surface by chemical reaction.

An advantage of this non-shape-related application method is the omission of cutting, reshaping and positioning.

In again another embodiment of the invention, the separating layer is composed of organic material, for example leaf of a rubber tree.

In again another embodiment of the invention, the surface has nonstick properties (Lotus leaf effect) owing to its structure.

In a further embodiment of the invention, the separating layer is a powder layer or a layer of tiny plates, said tiny plates being oriented such that their planar extent is roughly parallel to the layer. One advantage is the simple placement by pouring or inward blowing and, if necessary, subsequent removal of excess material by, for example, suction or emptying. Possible materials are plastics such as thermosets and thermoplastics or metals. Another advantage is the slidability of the individual tiny plates relative to one another, which additionally positively influences the flow characteristics of the sealant.

It is advantageous when the separating layer has openings, by means of which the inner absorber partially rests directly on the bonding agent and thus comes into direct adhesive contact with the sealant. No additional adhesive coating on the separating-layer surface facing the inner absorber is required.

Here, it is useful when the openings occupy, in total, an area of from 2% to 50%, preferably an area of from 5 to 30%, particularly preferably an area of from 10 to 15%, with respect to the surface area of the inner absorber. In a particular embodiment, the openings are arranged such that they are uniformly distributed over the area of the separating layer. The surface area of the inner absorber is the area facing the tire. The influence of the inner absorber on the sealing properties is thereby reduced to a minimum.

It is useful when the opening, in top view of the separating layer, has the shape of a circle, of an oval, and/or of an elongated slit, in an uninterrupted or broken-through manner, the slits in the separating layer being arranged lengthways, transversely or roughly diagonally. Suitable dimensioning of the openings provides sufficiently flowable material for reliable sealing and, at the same time, generates sufficient adhesive force for the foam.

It is useful when the separating layer is provided with adhesive properties on its surface facing the inner absorber, said adhesive properties preferably being obtained by a suitable surface treatment such as, for example, gumming the separating layer, the application of a further adhesive, a mechanical connection such as, for example, Velcro or a combination thereof. The adhesive can be supplied prefabricated with the separating layer, sprayed on, spread on, applied as a double-sided adhesive tape or, for example, as a pure adhesive layer on support material.

It is useful when the separating layer has a maximum thickness of ≤2.0 mm, preferably a thickness (11) of from 0.05 mm to 0.5 mm. The thickness is measured in the radial direction in the state of being arranged on the tire.

It is advantageous when the inner absorber has a radial thickness of ≥10 mm, preferably a thickness of from 20 mm to 40 mm.

The separating layer has a breadth which is equal to or greater than the breadth of the sealant layer. One advantage is a complete covering of the tacky sealant layer.

In an alternative embodiment, the separating layer has a breadth which is between the breadth of the sealant layer and the breadth of the inner absorber. One advantage is an offsetting of possible material and/or production tolerances.

In a further alternative embodiment, the separating layer has a breadth which roughly corresponds to the breadth of the inner absorber. One advantage is material savings and thus weight savings.

In again a further alternative embodiment, the separating layer has a smaller breadth than the inner absorber. Here, one advantage is an improved adhesive effect of the inner absorber on the sealant at the edge.

In all the embodiments mentioned, the sealant layer can be broader than, narrower than or just as broad as the inner absorber.

It is useful when the thickness of the sealant layer in those regions in which the separating layer directly rests on the sealant is from 1 mm to 5 mm, preferably a thickness of from 1.5 mm to 3.5 mm. In the prior art, the thickness of the sealant is roughly 7 mm. The greatly reduced sealant thickness according to the invention achieves cost advantages.

It is useful when the thickness of the sealant has local variations, for example thicker or contoured in the region of openings.

Possible in the context of the invention are all sealants which self-seal and are sufficiently tacky, at least immediately after application to the inner surface of the tire, for the inner absorber to be able to be pressed on and to be thus adhesively bonded with the sealant. Therefore, sealants based on polyurethane, or sealants which are a viscous mixture based on a butyl rubber, on a polybutene or on silicone, are suitable for example.

According to the invention, the separating layer can, for example, be designed as per the following table:

TABLE

| Variant | Design of separating layer | Surface facing the sealant | Surface facing the inner absorber |
| --- | --- | --- | --- |
| 1 | Without openings | Non-antiflow | Adhesive or tacky |
| 2 | With openings | Non-antiflow | Nonadhesive |
| 3 | With openings | Non-antiflow | Adhesive or tacky |

According to the prior art, the sealant is first applied to the inner layer and the inner absorber is then adhesively attached to the sealant in the finished tire.

According to this invention, the separating layer is either applied to the sealant before the inner absorber or is applied together with the inner absorber, or the inner absorber is prefabricated with separating layer and sealant and introduced as a component into the tire.

Further features, advantages and details of the invention will now be described in more detail with reference to the drawings, which depict not only an exemplary embodiment of the prior art, but also a schematic inventive exemplary embodiments. In the drawings.

FIGS. 3a, 3b, 3c, 3d, 3e each show a top view of a separating layer having openings.

Figure 1:
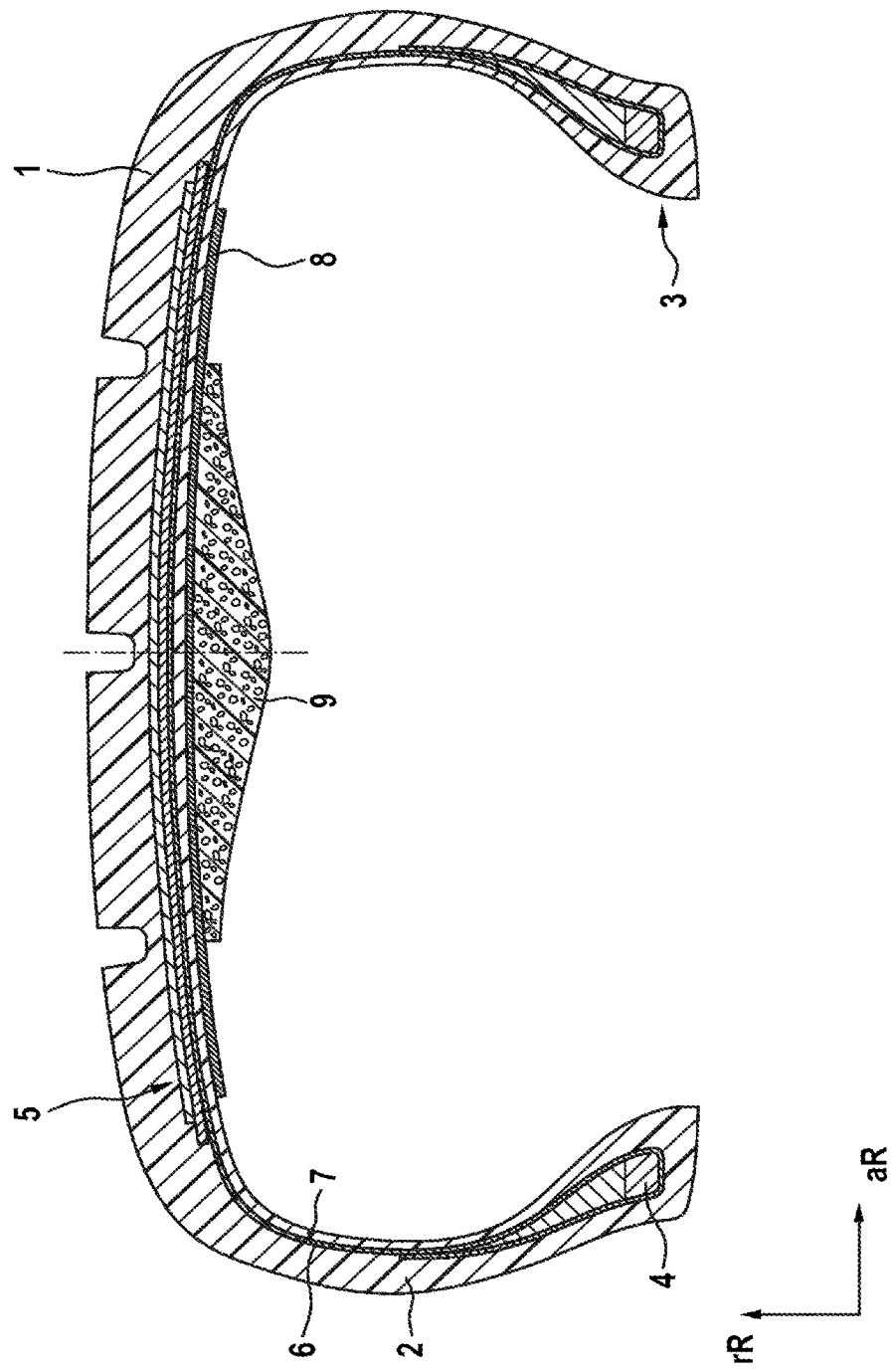
FIG. 1 shows a cross section through a pneumatic vehicle tire of the prior art.

FIG. 1 depicts a cross section through a radial automobile tire having a profiled tread 1, sidewalls 2, bead regions 3, bead cores 4 and also a multi-ply belt composite 5 and a carcass insert 6. The inner area of the tire is covered with an inner layer 7 composed of an airtight rubber compound. Applied to the inner surface of the inner layer 7, said inner surface being opposite from the tread 1, is a sealant 8 which in the event of puncture—tire damage—is capable of behaving in a self-sealing manner. Adhering to the sealant 8 is an inner absorber 9 which is, as will be described below, pressed onto the sealant 8 immediately after the application of the sealant 8 while said sealant is still sufficiently tacky. With respect to its sound-absorbing properties, the inner absorber 9 is tailored to the tire cavity frequency. Here, the inner absorber 9 has, for example, a cross section which has a roughly elongated triangle shape and is symmetrical with respect to the tire equator. The foam of the inner absorber 9 is an open-cell foam, since it is best suited to absorbing sound. Possible sealants are, for example, polyurethane gels or viscous mixtures based on butyl rubbers, polybutenes or silicone, it being possible for the mixtures to contain the customary further constituents, such as plasticizer oils. The sealant is introduced, for example by spraying, such that it covers at least the inner surface opposite from the tread 1. The tire can be rotated in order to optimally distribute the sealant on the inner surface. Furthermore, the sealant is introduced in such an amount that the layer thickness of the sealant is between 7 mm and 8 mm. The sealant ought to be relatively liquid and tacky at least immediately after application. At this time, the prefabricated inner absorber 9 is introduced into the interior of the tire. After full reaction, the inner absorber 9 adheres to the sealant 8, which is elastically deformable, but remains immobile to a very great extent.

Figure 2:
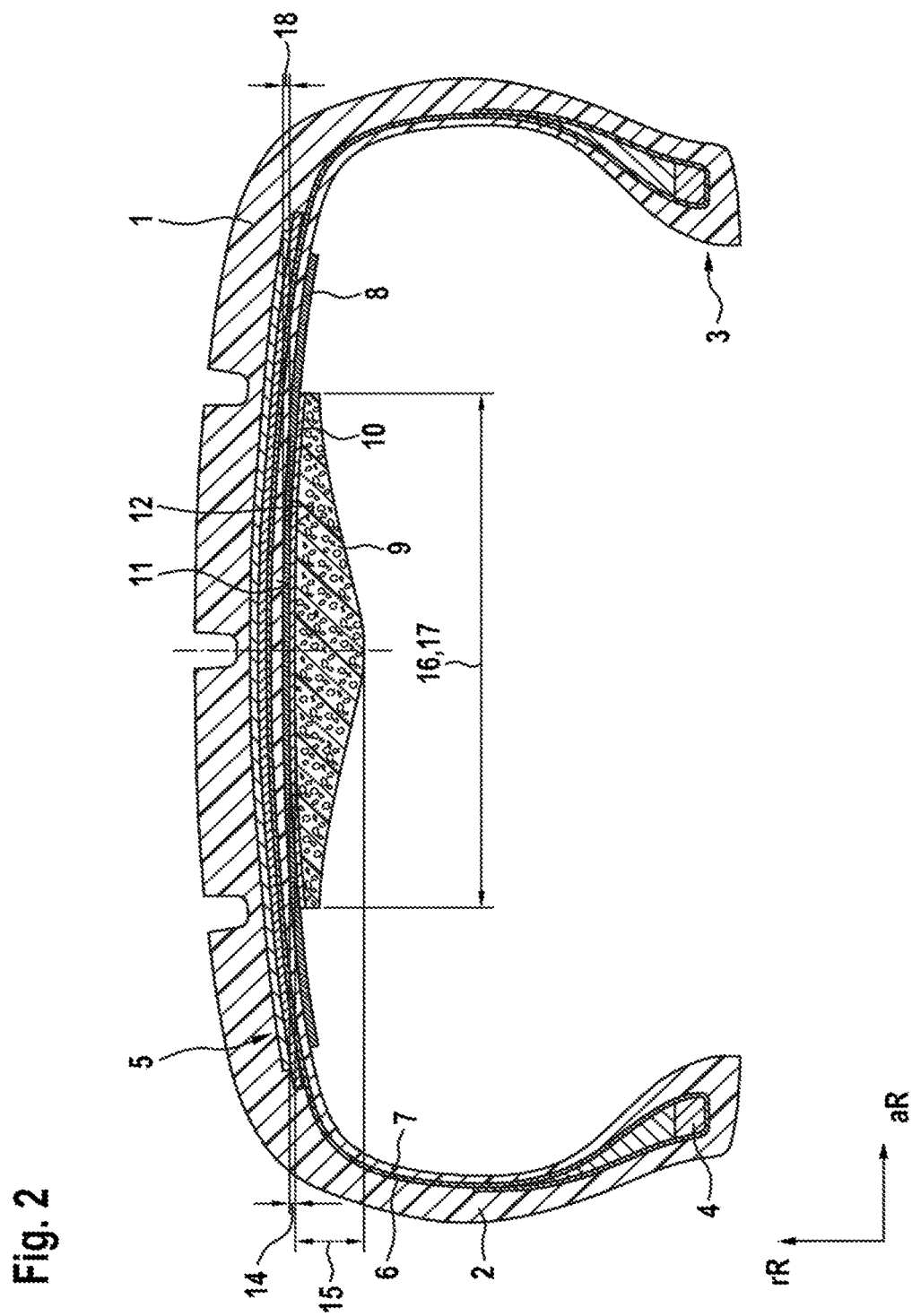
FIG. 2 shows a cross section through a pneumatic vehicle tire according to the invention.

FIG. 2 shows a cross section through a pneumatic vehicle tire according to the invention. The pneumatic vehicle tire according to the invention differs from the prior-art tire of FIG. 1 in that a separating layer 10 is arranged between the sealant 8 and the inner absorber 9. The separating layer 10 is made in such a way as to ensure a flowability of the sealant 8 that is sufficient for the purposes of sealing and also a reliable adhesion of the inner absorber 9. The separating layer 10 is, for example, a film or an oil-soaked fabric. The surface 11 of the separating layer that is facing the sealant has nonstick properties. The surface 12 of the separating layer that is facing the inner absorber has adhesive or nonadhesive properties. Nevertheless, in order to reliably arrange the inner absorber 9 in an adhesive manner, the separating layer 10 can have openings 13 (not depicted here, cf. FIG. 3), by means of which the inner absorber 9 partially rests directly on the sealant. The openings 13 occupy, in total, an area of from 2% to 50% with respect to the surface area of the inner absorber. In top view of the separating layer 10, the openings 13 are arranged such that they are uniformly distributed over the area of the separating layer 10.

The separating layer 10 has a thickness 14 of from 0.05 to 2.0 mm. The inner absorber 9 has a thickness 15 of from 20 mm to 40 mm. The separating layer 10 has a breadth 16 which roughly corresponds to the breadth 17 of the foam ring. The thickness 18 of the sealant layer 8 is between roughly 1.0 mm and 7.0 mm in those regions in which the separating layer 10 directly rests on the sealant 8. The sealant layer can have local variations in layer thickness; in particular, it can be contoured in the axial direction. Particular preference is given to a thickness of 3.5 mm in regions beyond the inner absorber.

Figure 3A:
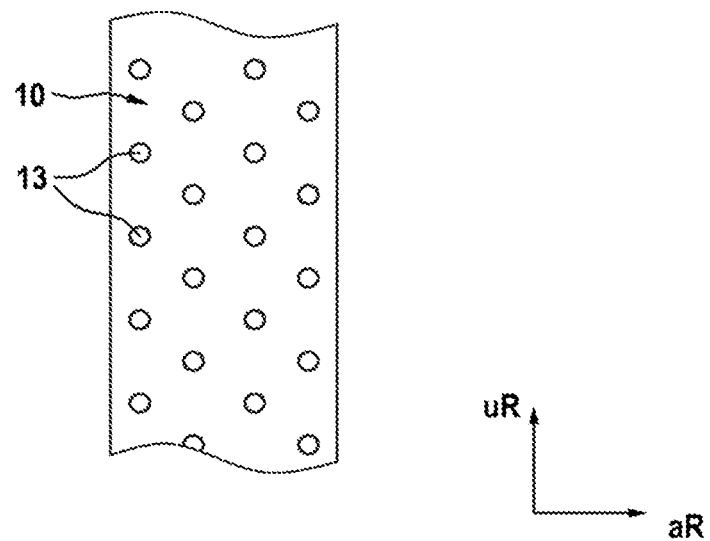
Figure 3B:
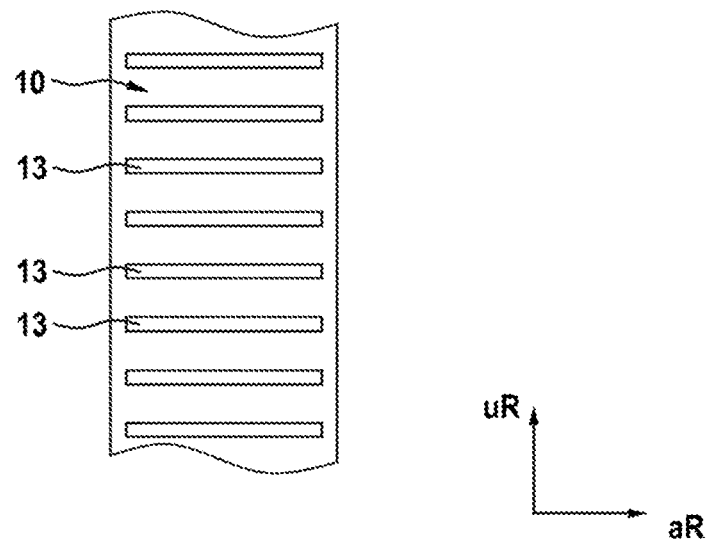
Figure 3C:
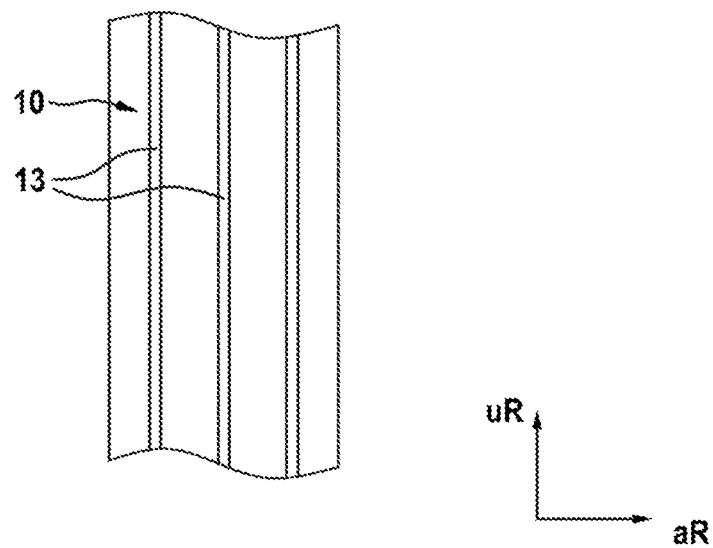
Figure 3D:
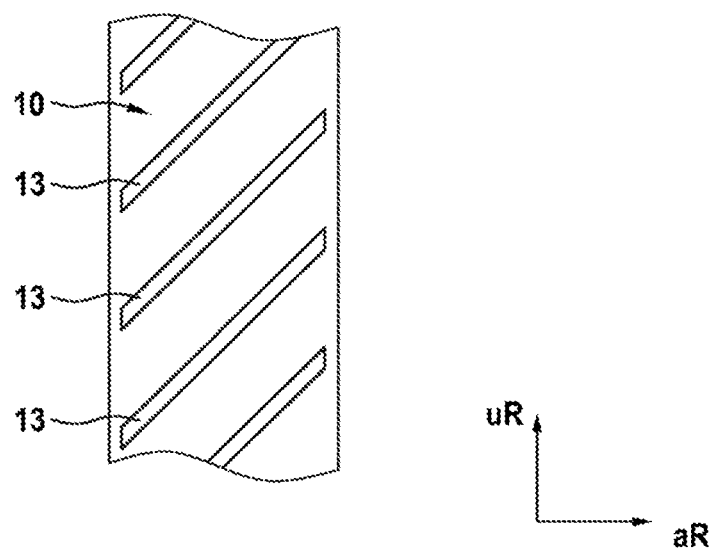
Figure 3E:
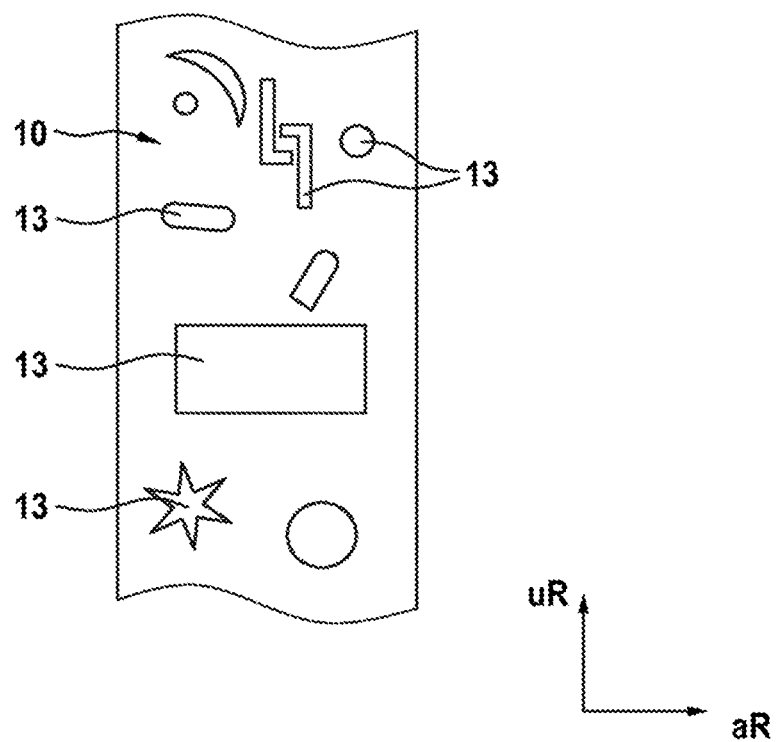

FIGS. 3a, 3b, 3c, 3d each show a top view of a separating layer 10 having openings 13. FIG. 3a shows circular openings 13, and FIGS. 3b, 3c and 3d show slit openings 13, which are arranged transversely to the longitudinal extent of the separating layer 10 in FIG. 3b, in parallel to the longitudinal extent of the separating layer 10 in FIG. 3c, and diagonally to the longitudinal extent of the separating layer 10 in FIG. 3d. FIG. 3e shows openings 13 of various geometries realized on the same separating layer 10. The openings 13 can be arranged in a regular or irregular manner and/or appear in various sizes next to one another. By way of example, irregularly recurring intervals are envisaged in the case of 3b. By way of example, it is not equidistant in the case of 3c

LIST OF REFERENCE SIGNS

1 . . . Tread
2 . . . Sidewall
3 . . . Bead region
4 . . . Bead core
5 . . . Belt composite
6 . . . Carcass insert
7 . . . Inner layer
8 . . . Sealant layer
9 . . . Inner absorber
10 . . . Separating layer
11 . . . Surface of the separating layer that is facing the sealant
12 . . . Surface of the separating layer that is facing the inner absorber
13 . . . Opening
14 . . . Thickness of the separating layer
15 . . . Thickness of the inner absorber
16 . . . Breadth of the separating layer
17 . . . Breadth of the inner absorber
18 . . . Thickness of the sealant layer
rR . . . Radial direction
aR . . . Axial direction
uR . . . Circumferential direction

The invention claimed is:

1. A pneumatic vehicle tire comprising a sound-absorbing inner which is adhesively attached to an inner surface, opposite from a tread of, the pneumatic vehicle tire, wherein the sound-absorbing absorber is adhered to a self-sealing sealant, which at least immediately after application, the self-sealing sealant has a tackiness required for the purposes of adhesive attachment;
the pneumatic vehicle tire further comprising a separating layer arranged between the self-sealing sealant and the sound-absorbing inner, wherein the separating layer ensures flowability of the self-sealing sealant, and wherein the self-sealing sealant is sufficient for the purposes of sealing and also reliable adhesion of the sound-absorbing inner; and
wherein the separating layer is a powder layer or a layer of tiny plates.

2. The pneumatic vehicle tire as claimed in claim 1, wherein the separating layer is a film provided with one of a coating, a paper provided with a coating, a fabric provided with a coating, or a fabric soaked with a coating.

3. The pneumatic vehicle tire as claimed in claim 1, wherein the separating layer is a material which is applied as a liquid and is permanently elastic after curing.

4. The pneumatic vehicle tire as claimed in claim 1, wherein the separating layer is a material applied from a solid phase.

5. The pneumatic vehicle tire as claimed in claim 1, wherein the separating layer is a material applied from a gaseous phase.

6. The pneumatic vehicle tire as claimed in claim 1, wherein the separating layer is composed of organic material.

7. The pneumatic vehicle tire as claimed in claim 1, wherein the surface of the separating layer has nonstick properties owing to its structure.

8. The pneumatic vehicle tire as claimed in claim 1, wherein the separating layer is provided with adhesive properties on its surface facing the sound-absorbing inner.

9. The pneumatic vehicle tire as claimed in claim 1, wherein the separating layer has a maximum thickness of ≤2.0 mm.

10. The pneumatic vehicle tire as claimed in claim 1, wherein the sound-absorbing inner has a thickness of ≥10 mm.

11. The pneumatic vehicle tire as claimed in claim 1, wherein the self-sealing sealant is a polyurethane gel.

12. The pneumatic vehicle tire as claimed in claim 1, wherein the self-sealing sealant is a viscous mixture based on a butyl rubber, on a polybutene, or on silicone.

13. The pneumatic vehicle tire as claimed in claim 1, wherein the separating layer has a breadth which roughly corresponds to the breadth of the sound-absorbing inner.

14. The pneumatic vehicle tire as claimed in claim 1, wherein thickness of the self-sealing sealant in those regions in which the separating layer directly rests on the self-sealing sealant is from 1 mm to 5 mm.

15. The pneumatic vehicle tire as claimed in claim 1, wherein thickness of the self-sealing sealant has local variations.

16. A pneumatic vehicle tire comprising:
a sound-absorbing inner which is adhesively attached to an inner surface, opposite from a tread of, the pneumatic vehicle tire, wherein the sound-absorbing absorber is adhered to a self-sealing sealant, which at least immediately after application, the self-sealing sealant has a tackiness required for the purposes of adhesive attachment;
the pneumatic vehicle tire further comprising a separating layer arranged between the self-sealing sealant and the sound-absorbing inner, wherein the separating layer ensures flowability of the self-sealing sealant, and wherein the self-sealing sealant is sufficient for the purposes of sealing and also reliable adhesion of the sound-absorbing inner; and
wherein the separating layer comprises openings whereby the sound-absorbing inner partially rests directly on the self-sealing sealant, and therefore comes into direct adhesive contact with the self-sealing sealant.

17. The pneumatic vehicle tire as claimed in claim 16, wherein the separating layer is a powder layer or a layer of tiny plates.

18. The pneumatic vehicle tire as claimed in claim 16, wherein the openings occupy, in total, an area of from 2% to 50% with respect to the surface area of the sound-absorbing inner.

19. The pneumatic vehicle tire as claimed in claim 16, wherein the opening, in top view of the separating layer, has the shape of a circle, of an oval, of an elongated slit and/or any desired shape, in an uninterrupted or broken-through manner.

20. A method for producing a pneumatic vehicle tire as claimed in claimed 1, wherein the sound-absorbing inner is covered with the separating layer radially on the outside, and wherein the self-sealing is applied to the separating layer and arranged on the pneumatic vehicle tire which is already vulcanized.

* * * * *